(12) United States Patent
Li et al.

(10) Patent No.: US 8,864,028 B2
(45) Date of Patent: Oct. 21, 2014

(54) CARD INFORMATION PROTECTION DEVICE AND FINANCE SERVICE EQUIPMENT HAVING THE SAME

(75) Inventors: Yedong Li, Guangzhou (CN); Eduardas Vaigauskas, Guangzhou (CN); Xuewen Dong, Guangzhou (CN); Rongsheng Wang, Guangzhou (CN)

(73) Assignee: GRG Banking Equipment Co., Ltd., Guangzhou (CN)

( * ) Notice: Subject to any disclaimer, the term of this patent is extended or adjusted under 35 U.S.C. 154(b) by 0 days.

(21) Appl. No.: 13/884,269

(22) PCT Filed: Mar. 27, 2012

(86) PCT No.: PCT/CN2012/073129
§ 371 (c)(1),
(2), (4) Date: May 9, 2013

(87) PCT Pub. No.: WO2012/155694
PCT Pub. Date: Nov. 22, 2012

(65) Prior Publication Data
US 2014/0054368 A1  Feb. 27, 2014

(30) Foreign Application Priority Data
May 18, 2011  (CN) .......................... 2011 1 0129789

(51) Int. Cl.
*G06K 19/04* (2006.01)
*G06K 13/08* (2006.01)
*G07F 7/08* (2006.01)
*G07F 19/00* (2006.01)
*G06K 7/08* (2006.01)

(52) U.S. Cl.
CPC ............ *G06K 7/082* (2013.01); *G06K 13/0843* (2013.01); *G07F 7/0873* (2013.01); *G07F 19/2055* (2013.01)
USPC ........................................ 235/439; 369/77.11

(58) Field of Classification Search
USPC ........................................ 235/439; 369/77.11
See application file for complete search history.

(56) References Cited

U.S. PATENT DOCUMENTS
3,937,925 A   2/1976 Boothroyd
(Continued)

FOREIGN PATENT DOCUMENTS
CN   1717691 A   1/2006
CN   1753821 A   3/2006
CN   201348800 Y   11/2009
(Continued)

*Primary Examiner* — Christle I Marshall
(74) *Attorney, Agent, or Firm* — Kilpatrick Townsend & Stockton LLP

(57) ABSTRACT

A card information protection device and a finance service equipment having the same are provided. The card information protection device is arranged between a transverse card inlet and a longitudinal magnetic card information reader, and comprises a magnetic card transverse admission port. A magnetic card conveying channel is arranged between the magnetic card transverse admission port and the longitudinal magnetic card information reader. A magnetic card rotating mechanism is arranged in the magnetic card channel. The magnetic card rotating mechanism is used for rotating a transversely-inserted magnetic card to longitudinal direction in order to convey the magnetic card into the longitudinal magnetic card information reader, and rotating the longitudinal magnetic card returned by the longitudinal magnetic card information reader to transverse direction in order to convey the transverse magnetic card out. The problem that the whole magnetic strip of the magnetic card information reader which allows a user to plug the magnetic card in the longitudinal direction is completely scanned by a card stealer device illegally arranged in a card plug-in buckle in the process of longitudinally inserting the magnetic card can be effectively solved, and thereby the problem that the magnetic card information is stolen illegally can be thoroughly solved.

12 Claims, 7 Drawing Sheets

(56) References Cited

U.S. PATENT DOCUMENTS

| | | | | |
|---|---|---|---|---|
| 4,800,551 | A | * 1/1989 | Norris | 720/618 |
| 5,242,041 | A | 9/1993 | Isobe | |
| 8,474,700 | B1 | * 7/2013 | Lewis et al. | 235/379 |
| 2012/0080518 | A1 | * 4/2012 | Van Den Bogart et al. | 235/379 |
| 2013/0087615 | A1 | * 4/2013 | Tudor et al. | 235/449 |

FOREIGN PATENT DOCUMENTS

| | | |
|---|---|---|
| CN | 201392539 Y | 1/2010 |
| CN | 102324136 A | 1/2012 |
| EP | 0820042 A2 | 1/1998 |
| EP | 0731737 B1 | 1/2002 |
| JP | 5143838 A | 2/2013 |

* cited by examiner

CARD INFORMATION PROTECTION DEVICE AND FINANCE SERVICE EQUIPMENT HAVING THE SAME

This application is the national phase of International Application No. PCT/CN2012/073129, titled "CARD INFORMATION PROTECTION DEVICE AND FINANCE SERVICE EQUIPMENT HAVING THE SAME" filed on Mar. 27, 2012 which claims the benefit of priority to Chinese Patent Application No. 201110129789.7, titled "CARD INFORMATION PROTECTION DEVICE AND FINANCE SERVICE EQUIPMENT HAVING THE SAME" filed with the Chinese State Intellectual Property Office on May 18, 2011, the entire disclosure of which are incorporated herein by reference.

FIELD OF THE INVENTION

The present application relates to the field of an accounting device, in particular, to a self-service financial service apparatus with a card information protection device.

BACKGROUND OF THE INVENTION

People's financial activities are becoming easy and quick because of financial self-service apparatus. Thus, in recent years, financial apparatus with self-service transaction function are widely arranged from big and medium-size cities to villages and towns. With the large scale arrangement of financial self-service apparatus and the large scale issue of bank cards, safety problem of a card is becoming more and more serious. Especially with the development of science and technology in recent years, the technology of reading information of a magnetic card becomes quite easy. Some criminal gangs grasp the technology of cloning a card according to the acquired magnetic card information. Thus, card stealing incidents via the self-service financial apparatus occur frequently. Therefore, it becomes extremely important to ensure that the self-service financial apparatus can protect card information such that a user can safely use the card.

At present, in order to improve the safety of card information, it is suggested to substitute currently used magnetic cards with IC cards, but in view of the cost factor of the IC card and the cost caused by replacing the card reading modules in the prior widespread self-service financial service apparatus, it is extremely difficult to implement this solution.

SUMMARY OF THE INVENTION

In view of the technical problems mentioned above, an object of the present application is to provide a card information protection device which can effectively protect information of a. magnetic card from being read by a card stealing device during the insertion of the magnetic card, without having to replace the existing card reading module in the self-service financial service apparatus.

It is provided according to a first object of the present application a card information protection device which can effectively protect safety of card information when using the card, The card information protection device according to the present application is provided between a transverse card inserting slot and a longitudinal magnetic card information reader, and includes a transverse magnetic card receiving slot and a magnetic card conveying channel provided between the transverse magnetic card receiving slot and the longitudinal magnetic card information reader. A magnetic card rotating mechanism is provided in the magnetic card conveying channel for rotating a magnetic card inserted transversely to a longitudinal direction and conveying the magnetic card into the longitudinal magnetic card information reader, and then rotating the magnetic card, which is in the longitudinal direction and is returned by the longitudinal magnetic card information reader, to a transverse direction, thereby conveying the magnetic card out.

Preferably, the magnetic card conveying channel includes a channel plate, and the magnetic card rotating mechanism includes: two rotary wheels provided axis-symmetrically in a direction that the magnetic card is carried at an outer side of the channel plate, and a power mechanism for providing power to the rotary wheels. The channel plate is provided therein with grooves at positions corresponding to the rotary wheels, such that the rotary wheels protrude in the magnetic card conveying channel and form friction forces with the magnetic card being conveyed.

Further, the rotary wheels are cone-shaped, and a surface of each cone-shaped wheel forms a line contact with a surface of the magnetic card being conveyed.

Further, the magnetic card conveying channel is provided with at least two groups of thru-beam sensors for monitoring a position and an attitude of the magnetic card. At least one group of thru-beam sensors is arranged at detecting points for detecting a position of the magnetic card in the transverse direction in the magnetic card rotating mechanism, and at least one group of thru-beam sensors is arranged at detecting points for detecting a position of the longitudinal magnetic card in the longitudinal direction in the magnetic card rotating mechanism.

Further, the magnetic card conveying channel is provided with an elastic pressing mechanism at a side opposite to the magnetic card rotating mechanism, for providing the magnetic card with an elastic force such that the magnetic card is pressed against the rotary wheels.

Preferably, the magnetic card rotating mechanism includes a movable clamping plate mechanism perpendicular to a direction that the magnetic card is conveyed.

Preferably, a guiding plate is provided at an inner side of the magnetic card conveying channel adjacent to the longitudinal magnetic card information reader, for guiding the magnetic card in the longitudinal direction smoothly into or out of the longitudinal magnetic card information reader.

It is provided according to a second object of the present application a self-service financial service apparatus with a card information protection device.

The self-service financial service apparatus includes an operation panel and a longitudinal magnetic card information reader. A special arrangement of the self-service financial service apparatus is that, the operation panel is provided with a transverse card inserting slot, and the card information protection device according to any one of claims 1 to 7 is provided between the transverse card inserting slot and the longitudinal magnetic card information reader.

Compared with the prior art, the card information protection device according to the present application has advantageous effects including:

1. the card information protection device effectively solves the problem existing in the prior magnetic card information reader which allows a user to insert a card in a longitudinal direction that, when a magnetic card is inserted in the longitudinal direction, the entire magnetic strip would be completely scanned by a card stealing device illegally disposed at the card inserting slot. Thereby the present application can protect information of a magnetic card from being stolen illegally;

2. it is no need to replace the magnetic card information reader which allow a user to insert a card in a longitudinal direction in the prior self-service financial service apparatus, thus the card information protection device according to the present application can effectively save the cost of the banking institution and avoid tremendous waste; and 3. since the card information protection device is provided inside the self-service financial service apparatus, an aesthetic feeling of the self-service financial service apparatus can be protected from being damaged by a special-shaped card inserting slot.

DETAILED DESCRIPTION

Hereinafter, the card information protection device according to the present application will be further explained in conjunction with the accompanying drawings. It is to be noted that, the technical solution and design principle of the present application will be described in detail in the following by merely taking an optimum technical solution as an example.

Figure 1:
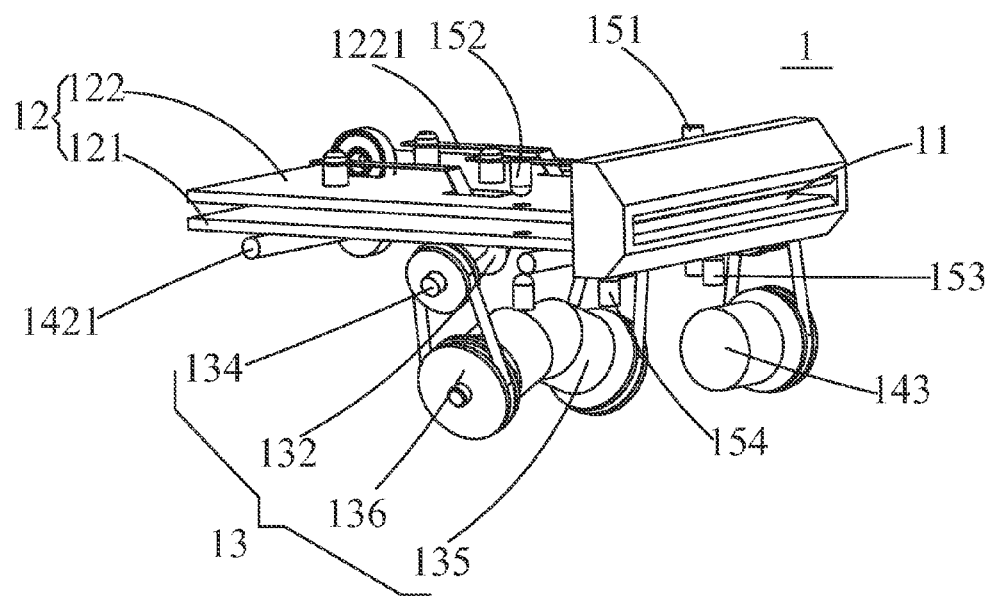
FIG. 1 is a schematic perspective view of a card information protection device according to a first embodiment of the present application.
Figure 2:
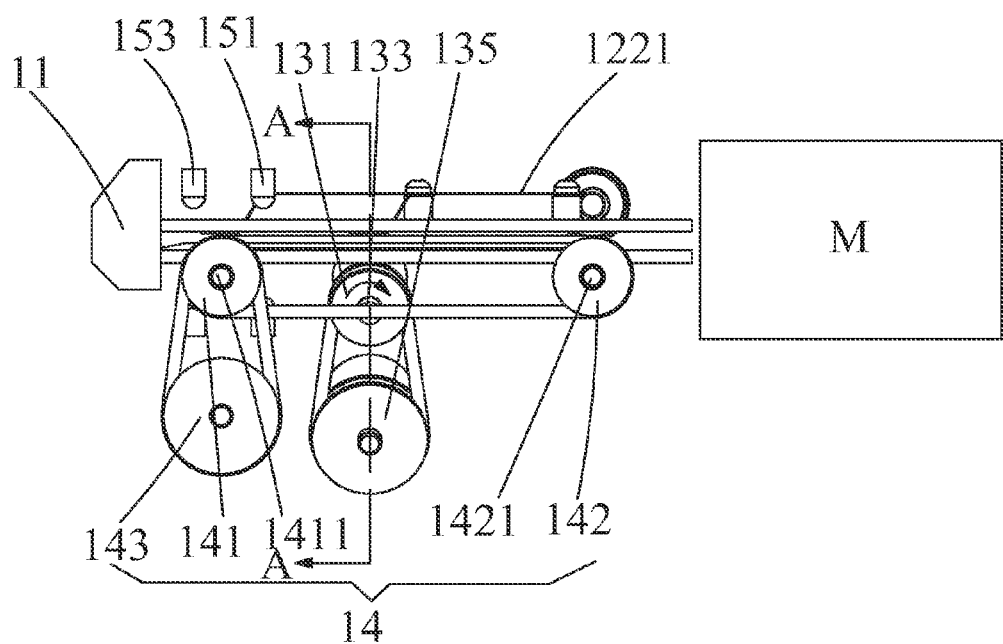
FIG. 2 is a schematic front view of the card information protection device shown in FIG. 1.

Reference is made to FIGS. 1 and 2, which show a schematic perspective view and a schematic front view of the card information protection device 1 according to the present application. The card information protection device 1 includes a transverse magnetic card receiving slot 11, a magnetic card conveying channel 12 is provided between the transverse magnetic card receiving slot 11 and a longitudinal magnetic card information reader M. An end of the magnetic card channel 12 opposite to the transverse magnetic card receiving slot 11 is contiguous to the card inserting slot of the longitudinal magnetic card information reader M. A magnetic card rotating mechanism 13 and a magnetic card carrying mechanism 14 are provided in the magnetic card conveying channel 12. The magnetic card conveying channel 12 includes a lower channel plate 121 and an upper channel plate 122, and the magnetic card conveying channel is formed between the upper and the lower channel plates.

Figure 3:
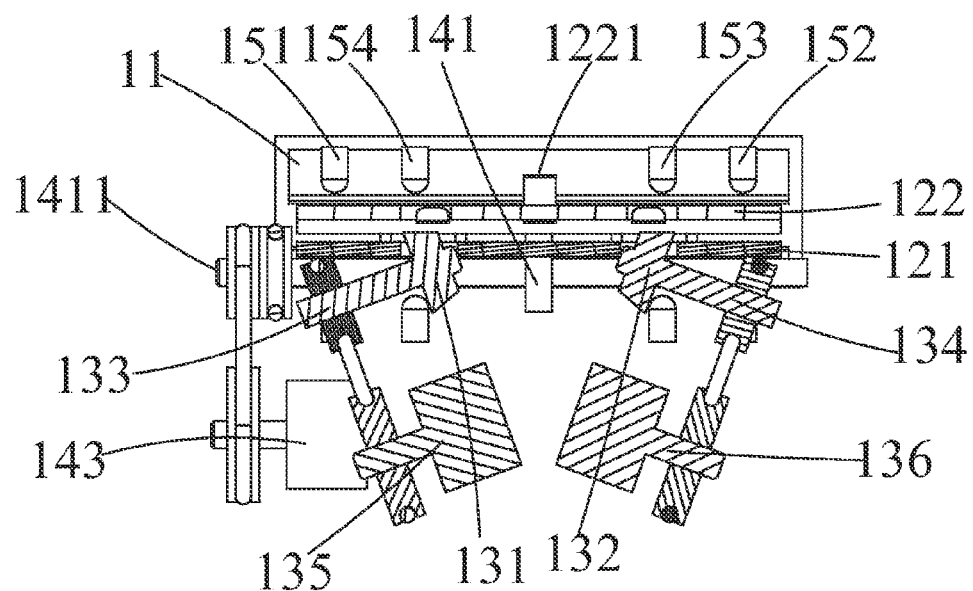
FIG. 3 is a sectional view of the card information protection device taken along line A-A in FIG. 2.
Figure 4:
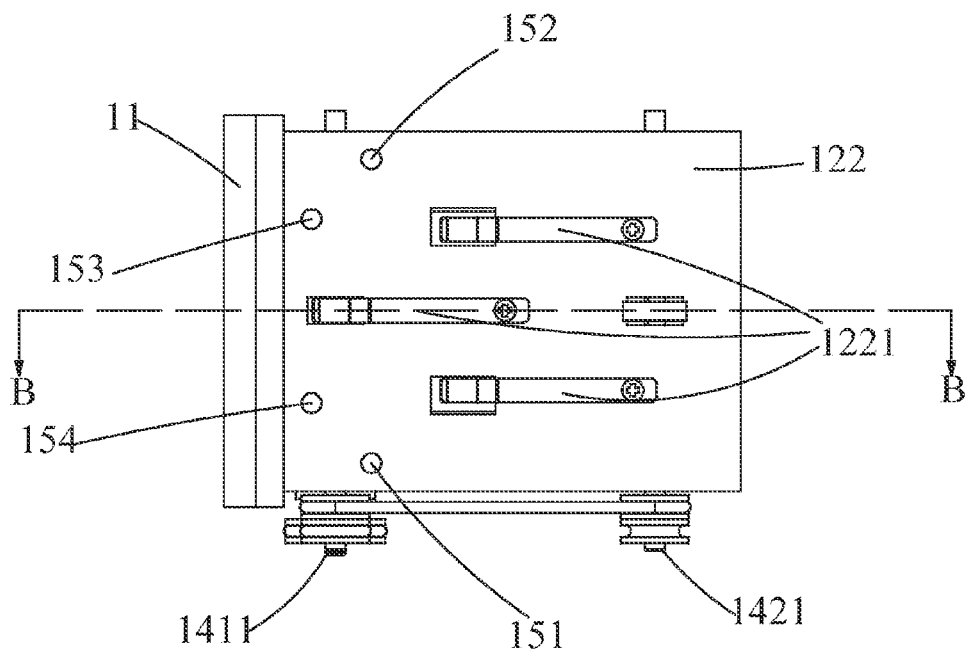
FIG. 4 is a schematic top view of the card information protection device shown in FIG. 1.
Figure 5:
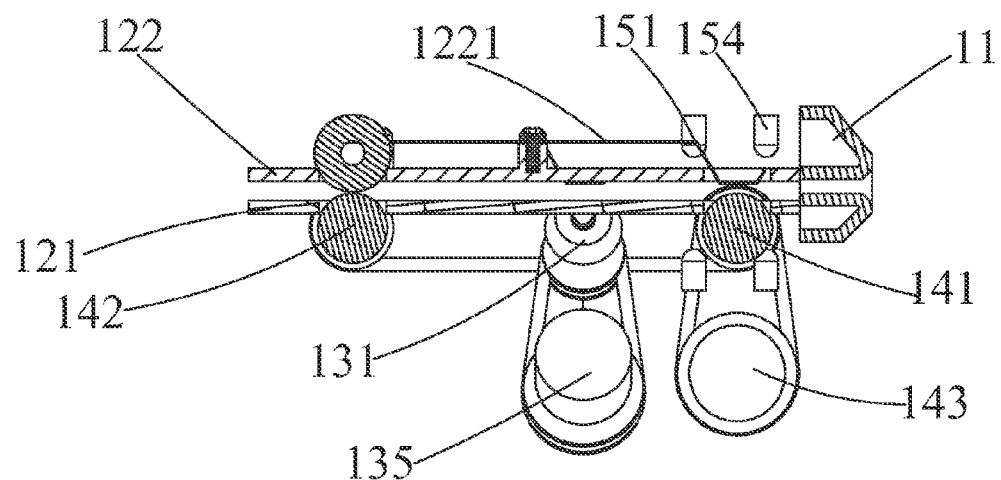
FIG. 5 is a sectional view of the card information protection device taken along line B-B in FIG. 4.

Reference is made to FIG. 3, which shows a sectional view of the card information protection device taken along line A-A in FIG. 2. The magnetic card rotating mechanism 13 includes: two rotary wheels 131, 132 disposed axis-symmetrically in a direction that a magnetic card is conveyed below the lower channel plate 121, rotary shafts 133 and 134 for rotating the rotary wheels 131 and 132, and drive motors 135 and 136 for providing power to the rotary shafts 133 and 134. The lower channel plate 12.1 is provided therein with grooves at positions corresponding to the rotary wheels 131 and 132, such that the rotary wheels 131 and 132 protrude in the magnetic card conveying channel to form friction forces with the magnetic card being conveyed. In order to obtain a position and an attitude of the magnetic card in the magnetic card conveying channel, at least two groups of thru-beam sensors are provided in the magnetic card conveying channel. In the present embodiment, two groups, which include four pairs of thru-beam sensors 151 152, 153 and 154, are provided. The thru-beam sensors 151 and 152 are arranged at detecting points for detecting that a card inserted transversely is conveyed to the rotating mechanism 13, and the thru-beam sensors 153 and 154 are arranged at detecting points for detecting that the magnetic card is in place after rotated at 90 degree. And the upper channel plate 122 and the lower channel plate 121 are provided with holes corresponding to the detecting points mentioned above.

Figure 6:
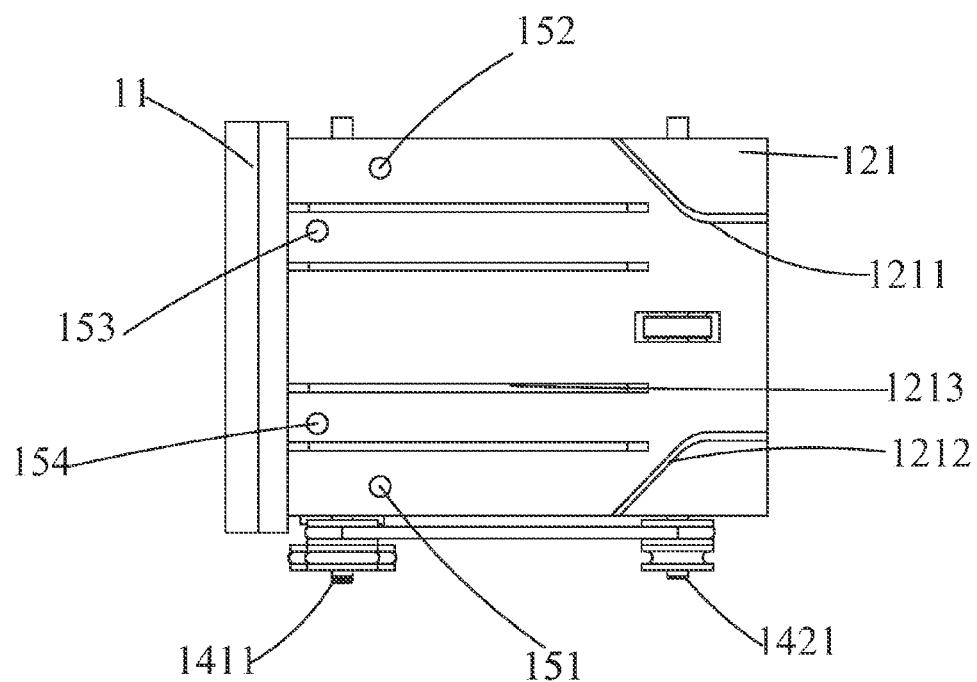
FIG. 6 is a schematic view of an optimized solution of the card information protection device shown in FIG. 1.

Referring to FIGS. 1 to 5, the magnetic card carrying mechanism 14 is provided between the transverse magnetic card receiving slot 11 and the magnetic card rotating mechanism 13 as well as between the magnetic card rotating mechanism 13 and the longitudinal magnetic card information reader M. The magnetic card carrying mechanism includes: carrying rolling wheels 141, 142; rotary shafts 1411, 1421 for rotating the carrying rolling wheels 141, 142 and a drive motor 143 for supplying power. Further, in order to ensure that the rotary wheels 131, 132 of the magnetic card rotating mechanism 13 can closely contact with surfaces of the magnetic card, the upper channel plate 122 of the magnetic card conveying channel 12 is provided with an elastic pressing sheet 1221. In the present embodiment, there are three elastic pressing sheets 1221, and the three elastic pressing sheets are evenly provided on the upper channel plate within a range that the magnetic card can be rotated, to apply downward elastic forces to the magnetic card being conveyed, such that the magnetic card is pressed against the rotary wheels 131, 132, Reference is made to FIG. 6. FIG. 6 shows a schematic top view of an optimized card information protection device according to the present application, with the upper channel plate removed. In order to ensure that the magnetic card rotated in place can be smoothly conveyed into the inserting slot of the longitudinal magnetic card information reader, guiding plates 1211 and 1212 are provided on the inner side of the lower channel plate 121 at positions adjacent to the longitudinal magnetic card information reader. The guiding plates 1211 and 1212 form a guiding channel of a "八" shape to guide the magnetic card rotated to the longitudinal direction smoothly into the longitudinal magnetic card information reader M. Further, in order to decrease the friction force applied to the magnetic card by the lower channel plate 121, four ribs 1213 extending in a direction that the magnetic card is conveyed are evenly provided on the lower channel plate 121.

Figure 7:
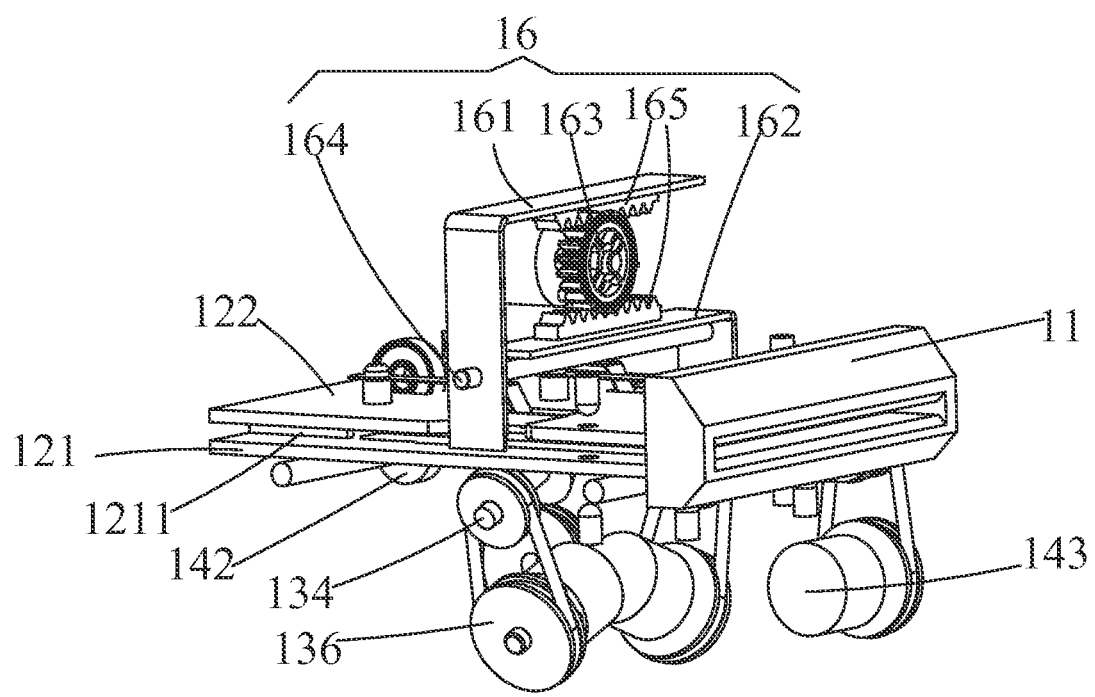
FIG. 7 is a schematic perspective view of another optimized solution of the card information protection device shown in FIG. 1.

Reference is made to FIG. 7. FIG. 7 is a schematic perspective view of another optimized card information protection device according to the present application. A clamping mechanism 16 is further provided based on the card information protection device described above so as to ensure that the rotating mechanism is accurately aligned with the card inserting slot of the longitudinal magnetic card information reader M. The clamping mechanism 16 includes a left clamping plate 161 and a right clamping plate 162, a guiding shaft 164 for the clamping plates, and a driving rack 165 for driving the left clamping plate 161 and the right clamping plate 162 to move rightwards or rightwards. The driving rack is driven by a gear 163 driven by a motor.

Figure 8:
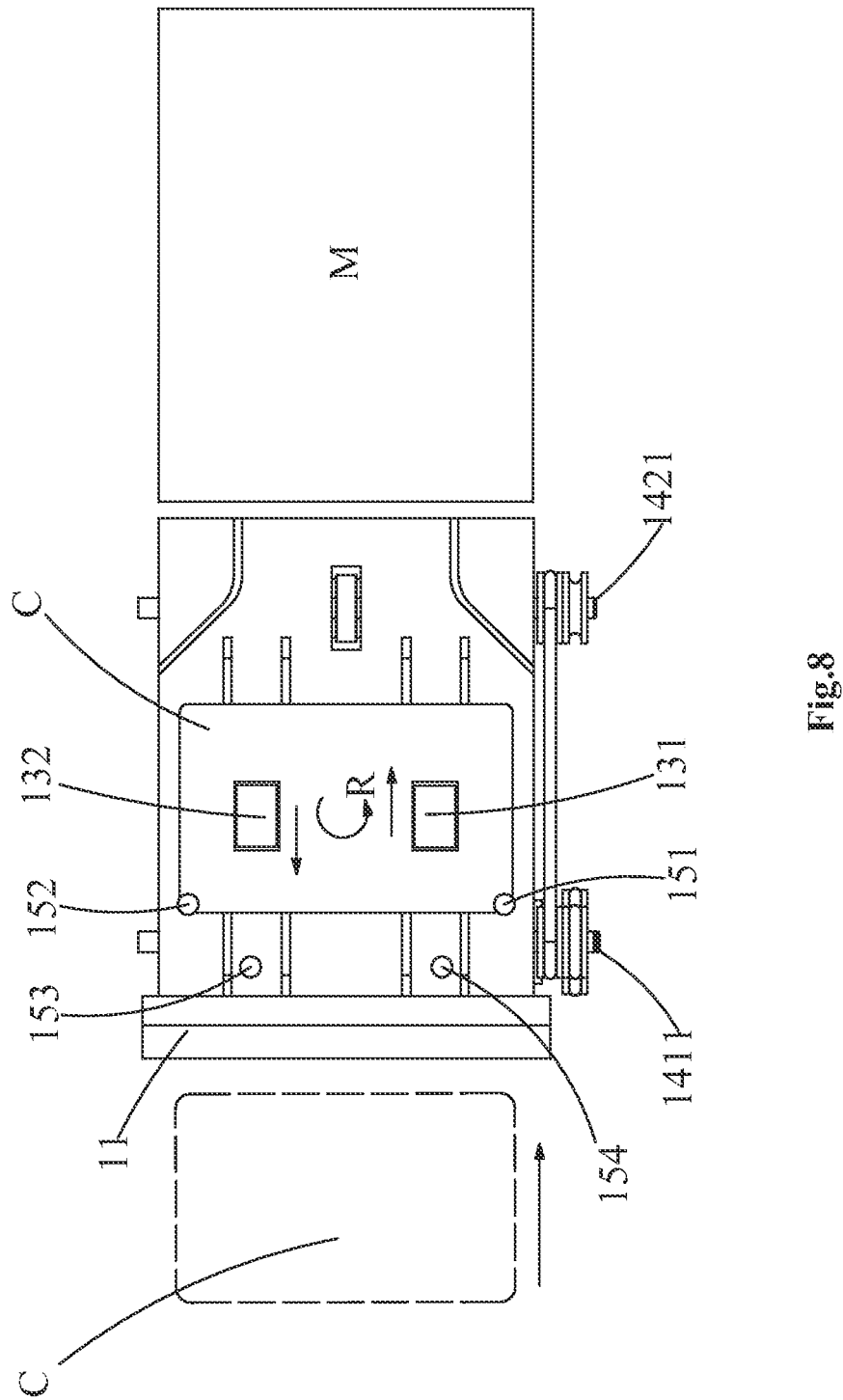
FIGS. 8-10 are schematic views showing the states of the magnetic card during the entering process.
Figure 9:
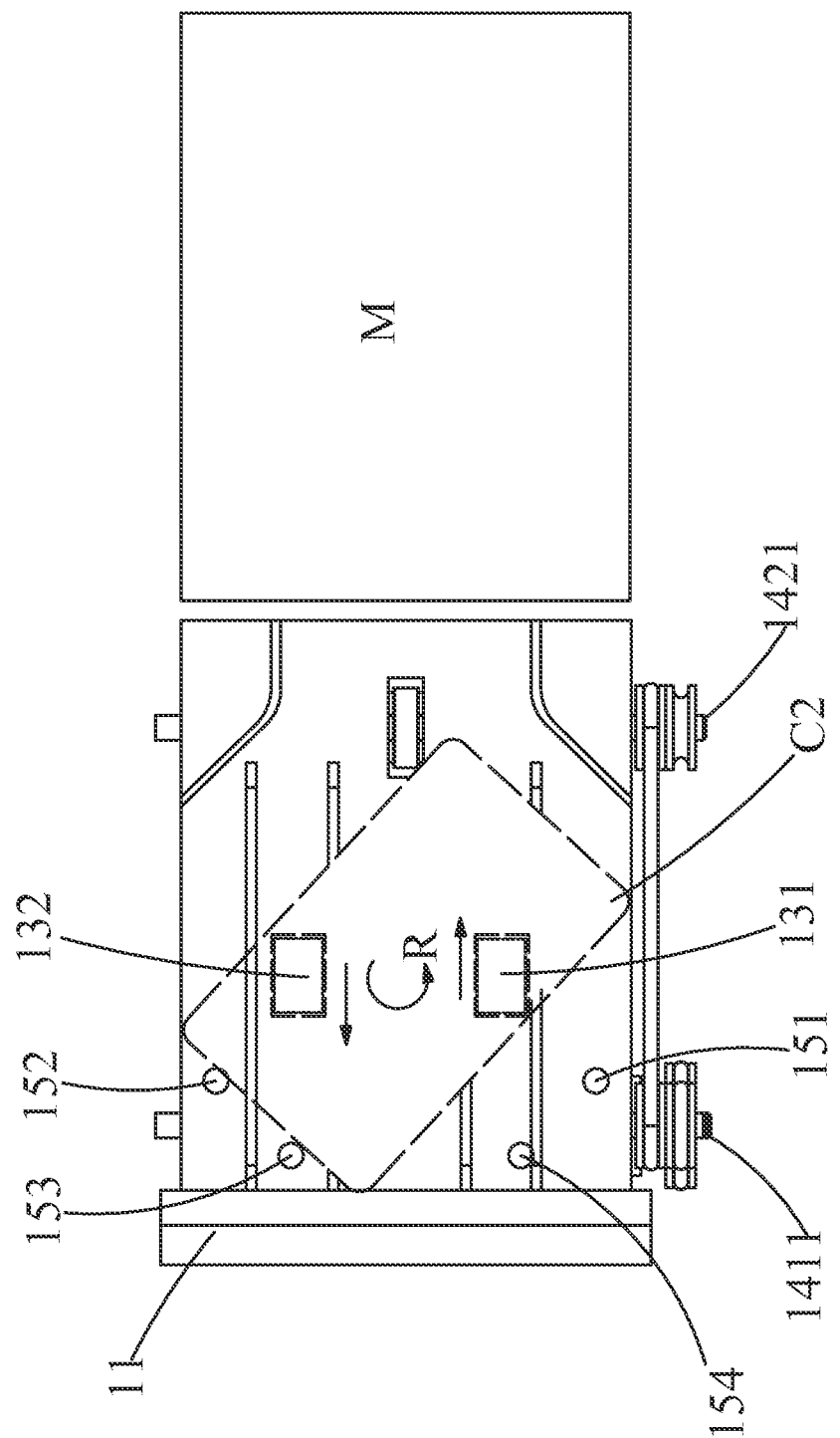
Figure 10:
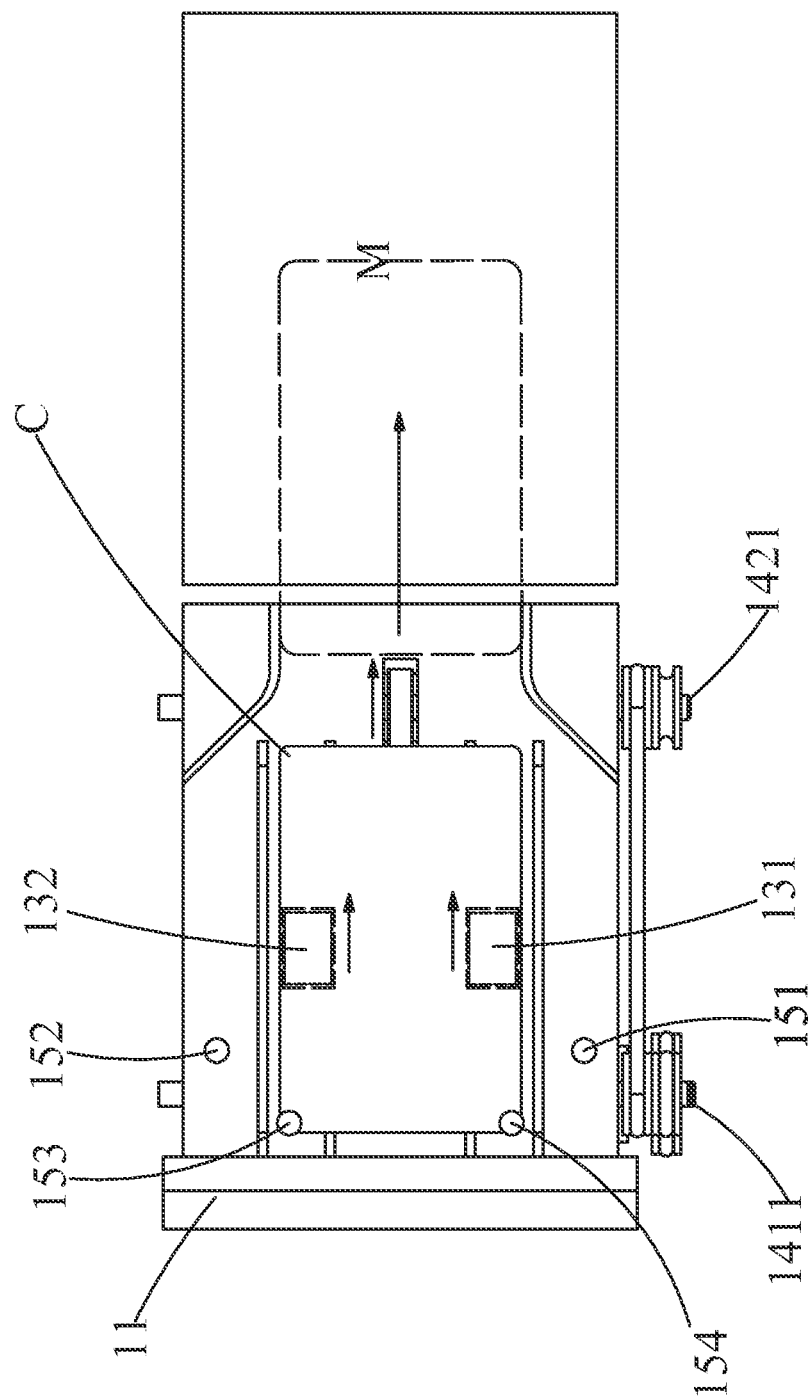

Referring to FIGS. 8 to 10, a card entering process and the operating principle of the card information protection device according to the present application will be further explained in detail.

Referring to FIG. 2 and FIG. 8, when a magnetic card C is inserted into the transverse magnetic card receiving slot 11, the carrying rolling wheel 141 carries the magnetic card C to the magnetic card rotating mechanism 13, and the rotary wheels 131 and 132 rotate in a positive direction shown in FIG. 2, such that the magnetic card C is carried to a predetermined position in the magnetic card rotating mechanism. When the thru-beam sensors 151 and 152 detects that the magnetic card C is in the predetermined position, the rotary wheel 131 keeps on rotating in the positive direction, while the rotary wheel 132 rotates in a negative direction. Under the actions of the rotary wheels 131 and 132 rotate in different directions, the magnetic card C is rotated in an R direction shown in FIG. 8. An intermediate state that the magnetic card C is rotated is shown in FIG. 9. The rotary wheels 131 and 132 continue to act on the magnetic card C in opposite directions, such that the magnetic card C is rotated to the positions of the thru-beam sensors 153 and 154, as shown in FIG. 10, then, the rotary wheel 131 continues to rotate in the positive direction, while the rotary wheel 132 is driven to rotate in the positive direction, such that the magnetic card C is conveyed into the longitudinal magnetic card information reader M where the magnetic card information reading of the magnetic card C is performed. When the operation is finished, the magnetic card C is exited out of the longitudinal magnetic card information reader M, and the magnetic card rotating mechanism 13 and the magnetic card carrying mechanism 14 operate reversely with respect to the above operation, such that the magnetic card is exited out.

The operation of the card information protection device with the clamping mechanism shown in FIG. 7 is substantially the same as that described above, the only difference lies in that, when the magnetic card is rotated to the position shown in FIG. 9, the left clamping plate 161 and the right clamping plate 162 are moved inwardly under the action of the drive motor, so as to ensure that the magnetic card after rotated is accurately aligned with the longitudinal magnetic card information reader.

The card information protection device is applied to the self-service financial service apparatus well known presently by arranging the card information protection device between the transverse magnetic card inserting slot of an operation panel and the longitudinal magnetic card information reader. As it only needs to arrange the card information protection device in an existing device, the arranging manner is obvious to those skilled in the art, and thus will not be described repeatedly.

The above embodiments are only preferred embodiments of the present application. It should be noted that, the preferred embodiments described above should not be construed as limitations to the present application, and the protection scope of the present application should be determined by the scopes defined by the claims. Those skilled in the art may make many improvements and modifications without departing from the spirit and scope of the present application, and these improvements and modifications should also be deemed to fall into the protection scope of the present application.

What is claimed is:

1. A card information protection device, which is provided between a transverse card inserting slot and a longitudinal magnetic card information reader, and comprises a transverse magnetic card receiving slot and a magnetic card conveying channel provided between the transverse magnetic card receiving slot and the longitudinal magnetic card information reader, wherein, a magnetic card rotating mechanism is provided in the magnetic card conveying channel for rotating a magnetic card inserted transversely to a longitudinal direction and conveying the magnetic card into the longitudinal magnetic card information reader, and then rotating the magnetic card, which is in the longitudinal direction and is returned by the longitudinal magnetic card information reader, to a transverse direction, thereby conveying the magnetic card out;

wherein the magnetic card conveying channel comprises a channel plate, and the magnetic card rotating mechanism comprises: two rotary wheels provided axis-symmetrically in a direction that the magnetic card is carried at an outer side of the channel plate, and a power mechanism for providing power to the rotary wheels, wherein the channel plate is provided with grooves at positions corresponding to the rotary wheels, such that the rotary wheels protrude in the magnetic card conveying channel and form friction forces with the magnetic card being conveyed.

2. The card information protection device according to claim 1, wherein the rotary wheels are cone-shaped, and a surface of each cone-shaped wheel forms a line contact with a surface of the magnetic card being conveyed.

3. The card information protection device according to claim 1, wherein the magnetic card conveying channel is provided with at least two groups of thru-beam sensors for monitoring a position and an attitude of the magnetic card, wherein at least one group of thru-beam sensors is arranged at detecting points for detecting a position of the magnetic card in the transverse direction in the magnetic card rotating mechanism, and at least one group of thru-beam sensors is arranged at detecting points for detecting a position of the magnetic card in the longitudinal direction in the magnetic card rotating mechanism.

4. The card information protection device according to claim 1, wherein the magnetic card conveying channel is provided with an elastic pressing mechanism at a side opposite to the magnetic card rotating mechanism, for providing the magnetic card with an elastic force such that the magnetic card is pressed against the rotary wheels.

5. The card information protection device according to claim 1, wherein the magnetic card rotating mechanism comprises a movable clamping plate mechanism perpendicular to a direction that the magnetic card is conveyed.

6. The card information protection device according to claim 1, wherein a guiding plate is provided at an inner side of the magnetic card conveying channel adjacent to the longitudinal magnetic card information reader, for guiding the magnetic card in the longitudinal direction smoothly into or out of the longitudinal magnetic card information reader.

7. A self-service financial service apparatus comprising an operation panel and a longitudinal magnetic card information reader, wherein the operation panel is provided with a transverse card inserting slot, and a card information protection device according to claim 1 is provided between the transverse card inserting slot and the longitudinal magnetic card information reader;

wherein the magnetic card conveying channel comprises a channel plate, and the magnetic card rotating mechanism comprises: two rotary wheels provided axis-symmetrically in a direction that the magnetic card is carried at an outer side of the channel plate, and a power mechanism for providing power to the rotary wheels, wherein the channel plate is provided with grooves at positions corresponding to the rotary wheels, such that the rotary wheels protrude in the magnetic card conveying channel and form friction forces with the magnetic card being conveyed.

8. The self-service financial service apparatus according to claim 7, wherein the rotary wheels are cone-shaped, and a surface of each cone-shaped wheel forms a line contact with a surface of the magnetic card being conveyed.

9. The self-service financial service apparatus according to claim 7, wherein the magnetic card conveying channel is provided with at least two groups of thru-beam sensors for monitoring a position and an attitude of the magnetic card, wherein at least one group of thru-beam sensors is arranged at detecting points for detecting a position of the magnetic card in the transverse direction in the magnetic card rotating mechanism, and at least one group of thru-beam sensors is arranged at detecting points for detecting a position of the magnetic card in the longitudinal direction in the magnetic card rotating mechanism.

10. The self-service financial service apparatus according to claim 7, wherein the magnetic card conveying channel is provided with an elastic pressing mechanism at a side opposite to the magnetic card rotating mechanism, for providing the magnetic card with an elastic force such that the magnetic card is pressed against the rotary wheels.

11. The self-service financial service apparatus according to claim 7, wherein the magnetic card rotating mechanism comprises a movable clamping plate mechanism perpendicular to a direction that the magnetic card is conveyed.

12. The self-service financial service apparatus according to claim 7, wherein a guiding plate is provided at an inner side of the magnetic card conveying channel adjacent to the longitudinal magnetic card information reader, for guiding the magnetic card in the longitudinal direction smoothly into or out of the longitudinal magnetic card information reader.

* * * * *